United States Patent [19]

Andruska et al.

[11] Patent Number: 5,544,236
[45] Date of Patent: Aug. 6, 1996

[54] ACCESS TO UNSUBSCRIBED FEATURES

[75] Inventors: Donald L. Andruska, Glen Ellyn; Venkata C. Majeti, Naperville, both of Ill.

[73] Assignee: AT&T Corp., Murray Hill, N.J.

[21] Appl. No.: 258,197

[22] Filed: Jun. 10, 1994

[51] Int. Cl.⁶ .................. H04M 3/42; H04M 11/00
[52] U.S. Cl. .................. 379/201; 379/207; 379/96; 379/112; 379/94
[58] Field of Search .................. 379/201, 207, 379/112, 144, 94, 93, 96, 90, 157, 97, 98

[56] References Cited

U.S. PATENT DOCUMENTS

| | | | |
|---|---|---|---|
| 4,232,199 | 11/1980 | Boatwright | 379/246 |
| 4,747,127 | 5/1988 | Hansen | 379/93 |
| 4,759,056 | 7/1988 | Akiyama | 379/197 |
| 4,897,866 | 1/1990 | Majmudar | 379/94 |
| 5,222,120 | 6/1993 | McLeod et al. | |
| 5,353,339 | 10/1994 | Scobee | 379/207 |

*Primary Examiner*—Jeffery Hofsass
*Assistant Examiner*—Thomas F. Presson

[57] ABSTRACT

An automated method and apparatus in a telecommunications network for granting, on demand, changes in the custom feature services available for use at the port. The caller is connected to a feature processor which interactively determines, through prompts and responses, the custom feature services desired by the caller differing from those available in the base services then provided to the port. The feature processor modifies the feature keys seen by the telecommunications network from those normal to the port to include those for the features selected by the caller. Activation of termination triggers cause feature services to revert to those base services normal to the port.

20 Claims, 6 Drawing Sheets

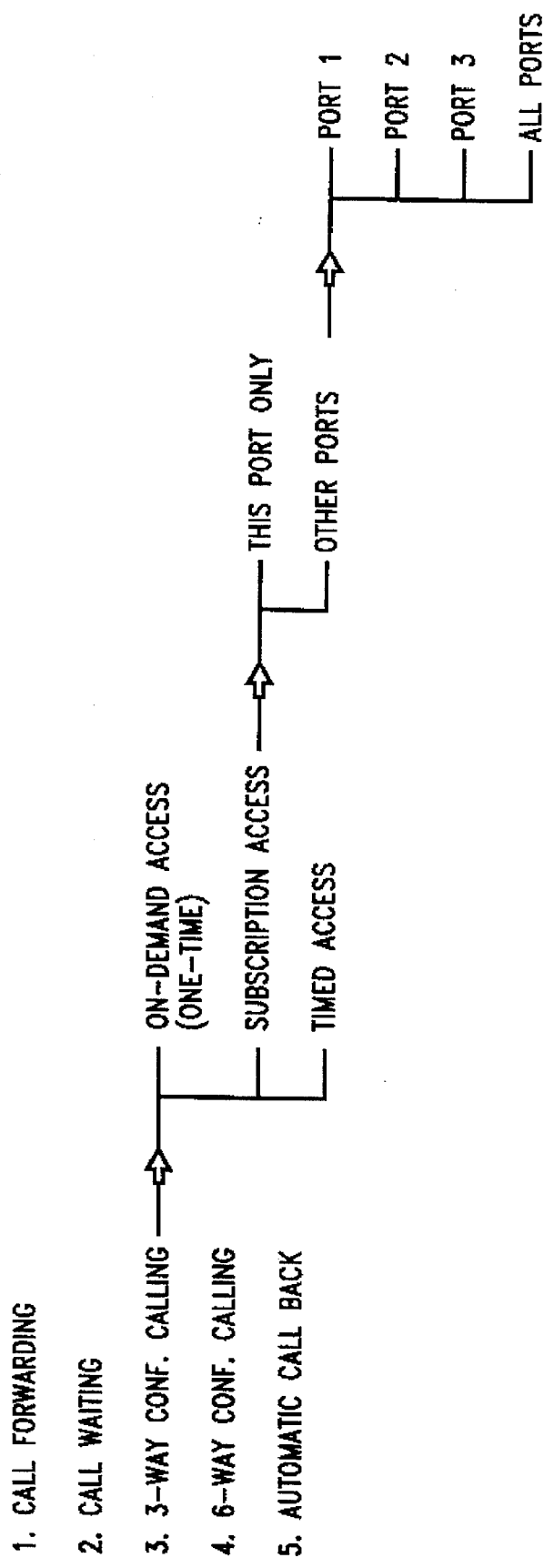

ACCESS TO UNSUBSCRIBED FEATURES

TECHNICAL FIELD

This invention relates to the provision of features and capabilities to telecommunications customers on an on-demand or an as-needed basis.

1. Problem

Custom features, such as conference calling, are provided as additional subscription services to telephone customers. Feature availability at a customer's terminal port is identified to the telephone system by a block of information residing in the switching system which services that terminal port. A problem of the prior art is that features were not directly modifiable by customers; customers were required to contact a phone company representative to pre-register a custom feature. Otherwise, the custom feature would not be available for the customer's use as part of the customer's regular telephone service.

Telephone customers are aware of custom features but many do not feel they can justify the subscription cost for the custom feature or feel that the usefulness of a custom feature is unproven for their individual needs. Prior art telecommunications systems provided no on-demand feature availability, that is, no means to select and use one or more unsubscribed custom features on a trial or on an as-needed basis. Further, there was no way to immediately terminate a custom feature. Still further, there was no way to automatically subscribe and simultaneously take advantage of one or more custom features and do so without operator assistance.

2. Solution

The above problems are solved and an advance is made over the prior art in accordance with our invention wherein a telecommunications customer is granted use of a desired feature contemporaneous with request. This is accomplished by the customer using a telephone keypad and/or handset, modifying feature keys which exist in the configuration of data in a static data block. The static data block is a block of information which defines and controls a call process in the telephone network for calls placed from the associated terminal port. While we refer to the block as a static data block, the term also encompasses dynamic data which is more transient in nature but can also define and control, in whole or in part, a call process.

A static data block may be defined in various ways. For example, it can be an array configuration in which the value of an element being 1 or 0 defines a feature being available or unavailable. It can be a list of items in which the feature of interest appears or does not appear as a member of the list. Further, it may be defined as a data set, such as a matrix, in which the feature is or is not a member of the set. And it can still further be defined as an encrypted group identifier or bit map. In each variation on the form taken by the static data block, the static data block may be resident on the telecommunications network or carried by the subscriber, for example, as an encryption on a credit card or smart card.

By proper modification of feature keys, the configuration recognized by the telecommunications network revises the services available to the caller from the associated terminal port, including access to custom features. Newly defined feature keys could, as examples, direct the telephone network to permit or deny access to a desired feature; to do so on a one-time basis or on a subscribed basis; and track unit/time charges and apply them to the customer's account.

Examples of custom features are conference calling, call forwarding for incoming calls to the customer's terminal port; call waiting; automatic call back; and access to intelligent peripherals for, for example, voice dialing, abbreviated dialing (speed dialing), special billing, and priority calling.

Advantageously, this arrangement permits a caller to select on an on-demand or as-needed basis one or more custom features and receive the service without delay, without prior subscription and without operator intervention.

While we have described our invention in terms of telephony, it has equal application to any telecommunications system including facsimile, electronic mail, and cellular systems.

In accordance with one aspect of the invention, in order to prevent abuse of feature access, permission to modify the static data block for the terminal port is only granted if the caller dials an appropriate personal identification number or uses some other authentication procedure; this ensures that the caller is authorized to use the services granted the terminal port and is authorized to extend those services to include additional custom features.

In accordance with one aspect of the invention, a customer can modify feature keys by keypad and/or voice entries at a terminal port telephone to activate and use an unsubscribed feature. Ports 1 and 2 are additional terminal ports for which additional calling features can likewise be provided on demand.

In accordance with another aspect of the invention, feature key selection results in change of controlling key configuration in the static data block.

In accordance with another aspect of the invention, a customer can access features on a one-time basis or activate a subscription for the service.

In accordance with another aspect of the invention, a customer can access features from a region of the network which is not part of the region in the central switch for the caller's terminal port which defines subscribed features for the port.

In accordance with another aspect of the invention, a custom feature can be terminated either through active request by the customer or automatically, consistent with parameters defined by the customer and/or the service provided.

BRIEF DESCRIPTION OF THE DRAWINGS

FIGS. 2, 2A–2D are a flow diagram illustrating a method of implementing applicant's invention.

FIG. 3 is a partial decision tree schematic illustrating choices in feature selection to define feature keys to the static data block.

DETAILED DESCRIPTION

Figure 1:
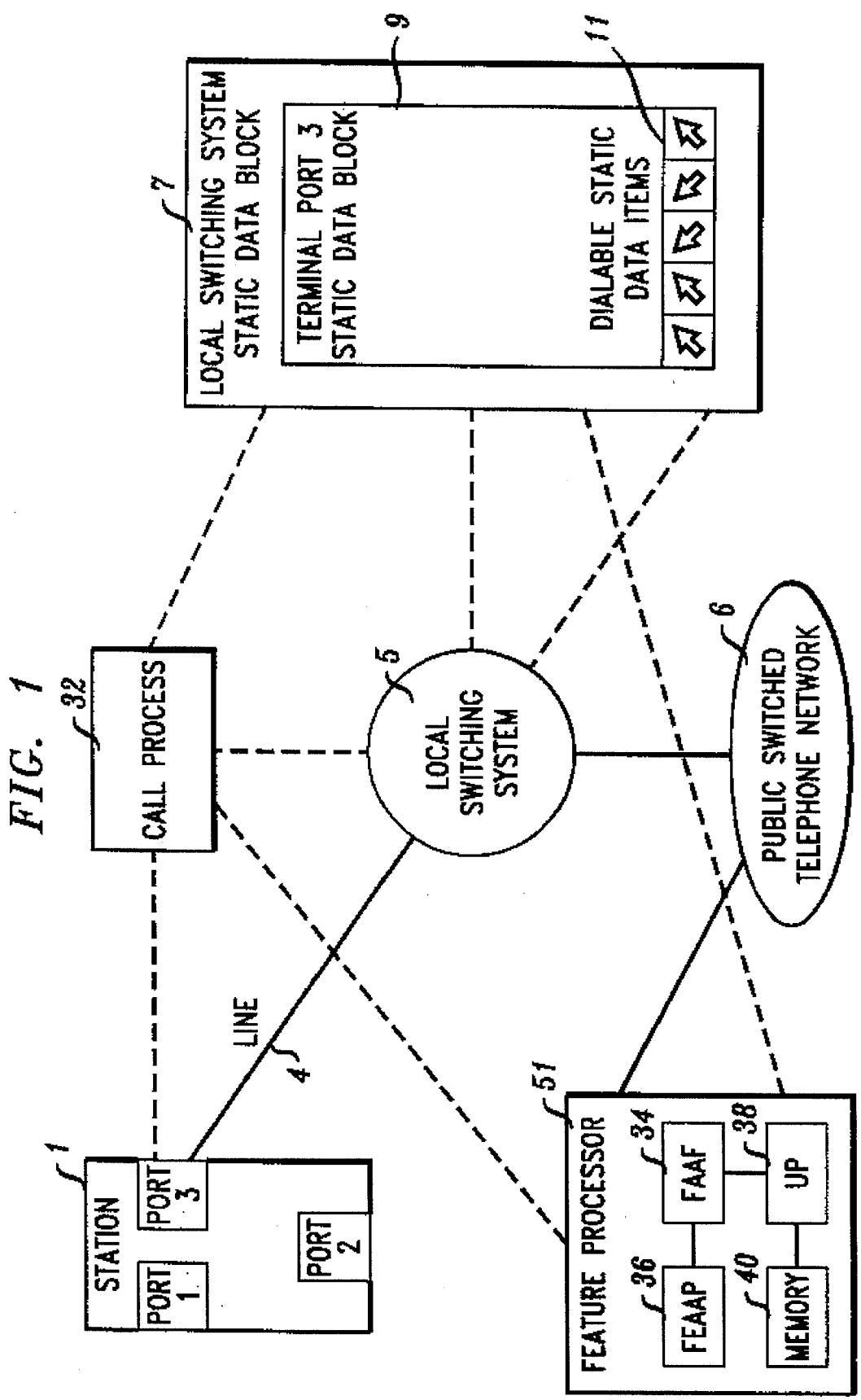
FIG. 1 is a block diagram illustrating the basic operation of applicant's invention.

FIG. 1 is a block diagram illustrating the basic operation of applicant's invention. Station 1 is one of many stations connected to local switching system 5. In FIG. 1, station 1 is connected at terminal port 3 over line 4 to switching system 5 which is part of a larger public switched telephone network 6. Line 4 may be a physical wire line or a wireless transmission path or a combination of signal carriers. Local switching system 5 is controlled by one or more processors (not shown), each operating under the control of one or more stored programs.

When a call is originated from a terminal port, for example terminal port 3, that terminal port will be assigned a call process 32, i.e., a block of memory for controlling the call. The call process 32 accesses the static data block 9 for terminal port 3 in switch static data block 7 of the local switching system 5.

The key configuration in static data block 9 defines the available service for terminal port 3, of which a subgroup determines custom feature service availability. If the static data items 9 do not include a key configuration for a certain custom feature, access to the feature will be denied to the caller from port 3. While most of the items in static data block 9 are administered by an operating telephone company and cannot be modified by callers, there are some static data items, which I refer to as dialable static data items 11, which can be modified in response to signals provided from the associated terminal port. Modification is by selection of feature keys which reconfigure the dialable static data items and by creation of a shadow static data block having a desired key configuration cast over the actual static data block key configuration.

By selecting new feature keys, the configurations in dialable static data items 11 are changed, and the menu of custom features is altered allowing the call process to access and provide as part of the service to the terminal port desired custom features, including the addition of new features, modification of existing features, and deletion of features. Access to the change process can be provided to a caller in a variety of ways.

For example, the customer can subscribe to a calling feature, let us call it the Call Feature (CF), the keys for which form part of the static data items configuration for station 1 and hence its terminal port 3. The CF provides a caller from terminal port 3, access to a change process for static data block 7, and affecting specifically sub-block 9 and its dialable static data items 11. As another example, a telecommunications service provider, e.g. the local telephone company or the long distance carrier, has a dialable processor which a caller accesses using a dialed access number. Once dialed, the processor provides a caller access to a change process for dialable static data items 11 for the terminal port in use.

By either approach, the caller's terminal port 3 is connected as part of call process 32 through public switched telephone network 5 to static data block 9 and to Feature Processor 51. Under the control of the call process 32, the access request and the feature processor 51, e.g., a processor in the local switching system or, as illustrated, another telephone system processor, connects the caller to a Feature Access Announcement Frame (FAAF) 34. Under the control of call process 32, the access request is recognized and a control process, the Front-End Authorization Access Process (FEAAP) 36, is assigned to control the FAAF 34. The FEAAP 36 performs a verification of the caller's personal identification code to confirm that the caller is authorized to request and use additional custom features. After the caller's authorization has been verified under the control of the FEAAP 36, an Update Process (UP) 38 is linked with the FAAF 34, the call process 32, and static data block 7. UP 38 includes a control process for communicating between call process 32 and the dialable static data items 11.

With link up, through prompts provided by the FAAF 34, the caller inputs using the telephone instrument at the terminal port 3 dialed or voice signals through a connection to a digit and/or voice receiver (not shown) which are communicated to the UP. Based upon the signal provided through call process 32 to the UP 38, the UP 38 creates new feature keys, that is, a revised configuration for dialable static data items 11, to modify the custom features available to terminal port 3.

The dialable static data items 11 also include static data items which identify feature parameters, for example, whether the feature must be subscribed for or may be elected on an on-demand basis, whether the feature can be billed as a one-time fee or on a unit/time charge, and the events which may or will cause termination of feature availability, which we refer to as termination triggers. Once the new feature keys are reflected in a changed configuration for the dialable static data items 11, the FAAF directs the caller in activating the selected additional feature(s) in the upcoming call.

The feature processor 51 creates feature modification by either storage in memory 40 of the original feature configuration and updating the feature keys in the configuration of the actual dialable static data items 11; or by creation of a shadow static data block and controller in memory 40 which sits on top of the call process 32 to allocate and manage the telephone network hardware and software as though the shadow static data block were the actual static data block 9 for terminal port 3 by preempting, in whole or in part, the telephone network's system reference to the actual data block 9 and the resident feature key configuration. Effectively, the shadow static data block casts a feature and control shadow over the actual static data block, which covers the actual static data block fully or partially, depending upon the amount of control and the number of features which are to be provided by the shadow static data block. The feature processor 51 activates in the phone system the termination triggers associated with the elected feature(s). As mentioned above, termination triggers cause the control process 32 to again access the UP 38 and reset feature keys configuration in actual static data items 11 or remove the shadow static data block from casting its control and feature shadow over the actual static data block 9 so that feature availability and control of subsequent call processes return to the actual static data block 9.

Regarding termination triggers, assuming, for example, the feature selected by the caller is for a single use only, the trigger can be line 4 ceasing to carry traffic, i.e., the caller completes the call and hangs up. Likewise, the trigger can include a timer which, upon the expiration of a preset period of time or passage of a date, activates the trigger.

Figure 2:
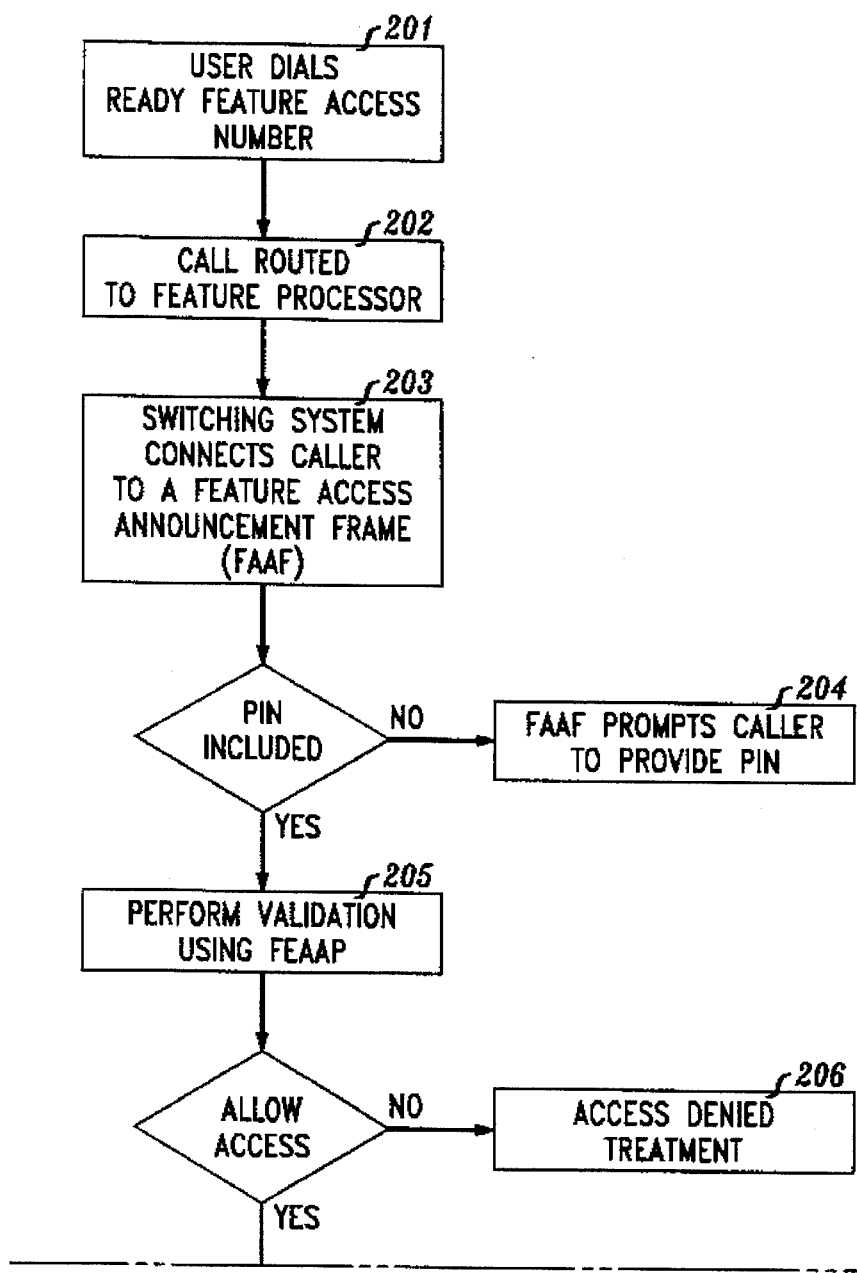

FIG. 2 is an illustration of on-demand access. The caller dials an access number (action block 201). The call is routed to a processor in the telephone system (action block 202) which provides access to one or more custom features. The processor connects the caller to a Feature Access Announcement Frame (FAAF) and the Front-End Authorization Access Process (FEAAP) (action block 203). If the access number includes the caller's personal identification number (PIN), the FEAAP performs a validation of the PIN. The PIN is requested to verify the authenticity of the request, but verification can also be accomplished by other means, e.g., matching the caller's voice against a prerecorded voice print.

Figure 2B:
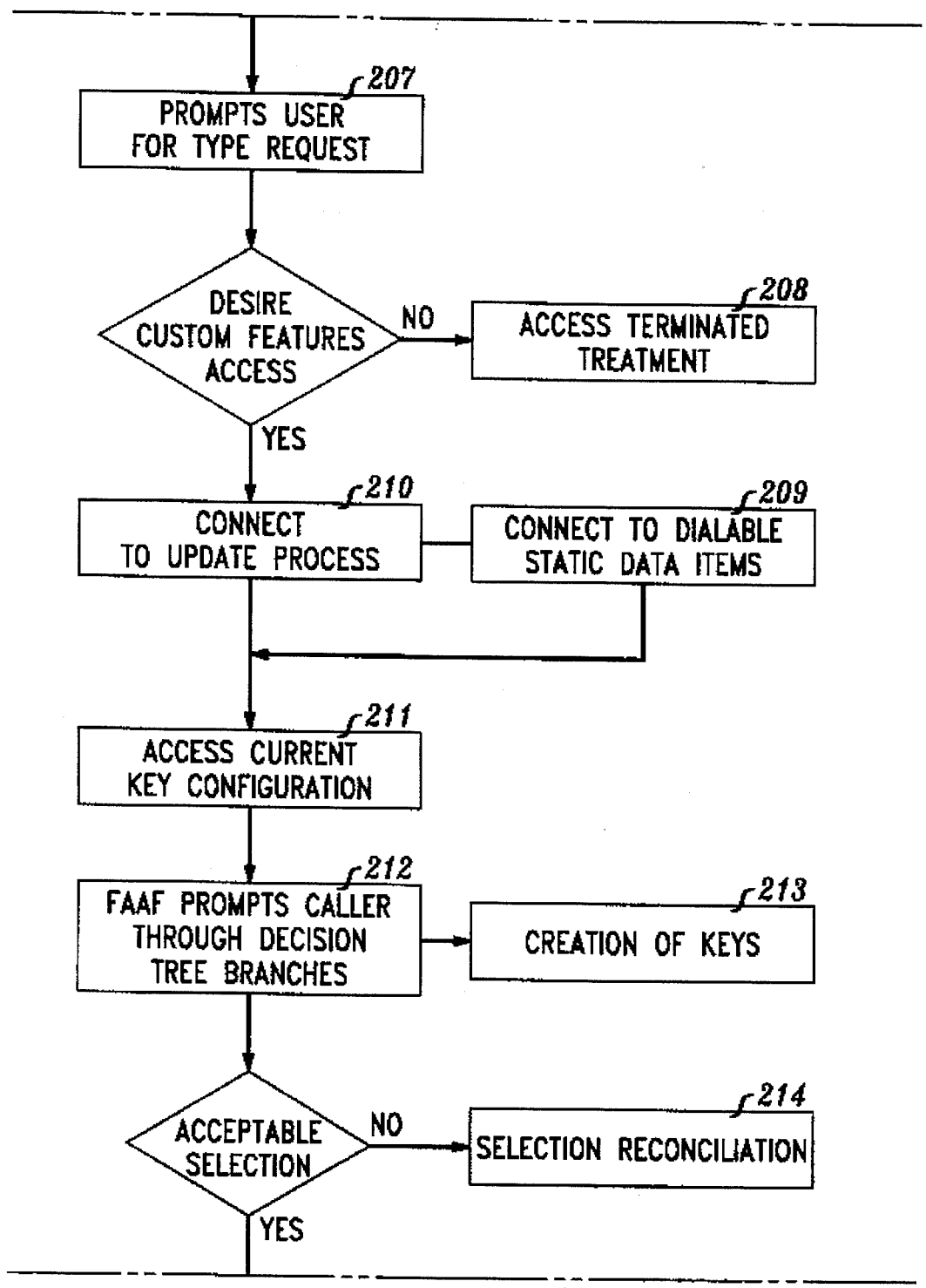

If the access number does not include the caller's PIN, the FAAF prompts the caller to provide the caller's PIN (action block 204), following which the FEAAP performs validation of the PIN (action block 205). If the FEAAP confirms that the caller is permitted access, the feature processor provides access for the call to proceed (action block 207) as shown in FIG. 2b. If not, a termination process is performed, which may include an announcement to the caller and the switch terminating access (action block 206) as shown in FIG. 2a.

Proceeding along FIG. 2b, if the caller does not confirm that custom features access is desired, the FAAF responds with a sign-off treatment (action block 208) which may include some type of announcement and the switch terminating access. If the caller confirms custom features access is desired, the FAAF links to both the dialable static data items for the terminal port (action block 209) from which the call originates and an Update Process (UP) (action block 210). With linkage confirmation, the UP accesses the existing feature keys defined by the dialable static data items configuration associated with the port (action block 211). Based upon the existing static data item configuration and the custom features parameters available through the features processor, the UP controls the FAAF to prompt the caller to serially select from a series of options (action block 212) and the UP obtains the signal responses which it manipulates to create interim feature keys (action block 213).

An example of the query/response pattern is: "If you wish to activate call forwarding, press or say 1; if you wish to activate call waiting, press or say 2, -(2)- If you wish call waiting for all phones in your station press or say 1; if you wish call waiting for only the phone from which you are calling, press or say 2. -(2)-."

A decision tree example is provided in FIG. 3. Completing the decision tree through to the end of its branch, the FAAF queries the caller whether the new feature selection is accepted. If the caller does not respond or provides a negative response, a reconciliation treatment is performed (action block 214) which may include, among others, any or all of the following: some type of announcement followed by prompted confirmation of each decision in the decision tree; erasure of the selections and the associated interim feature keys and reinitiation of the prompting/response process against the decision tree; the switch terminating the call.

Upon reaching the termination of the decision tree branch(es), the UP performs a validation on the features and variables selected (action block 215) and the FAAF prompts the caller whether additional features are desired. The process repeats for each custom feature desired (action block 216) as shown in FIG. 2c.

Figure 2C:
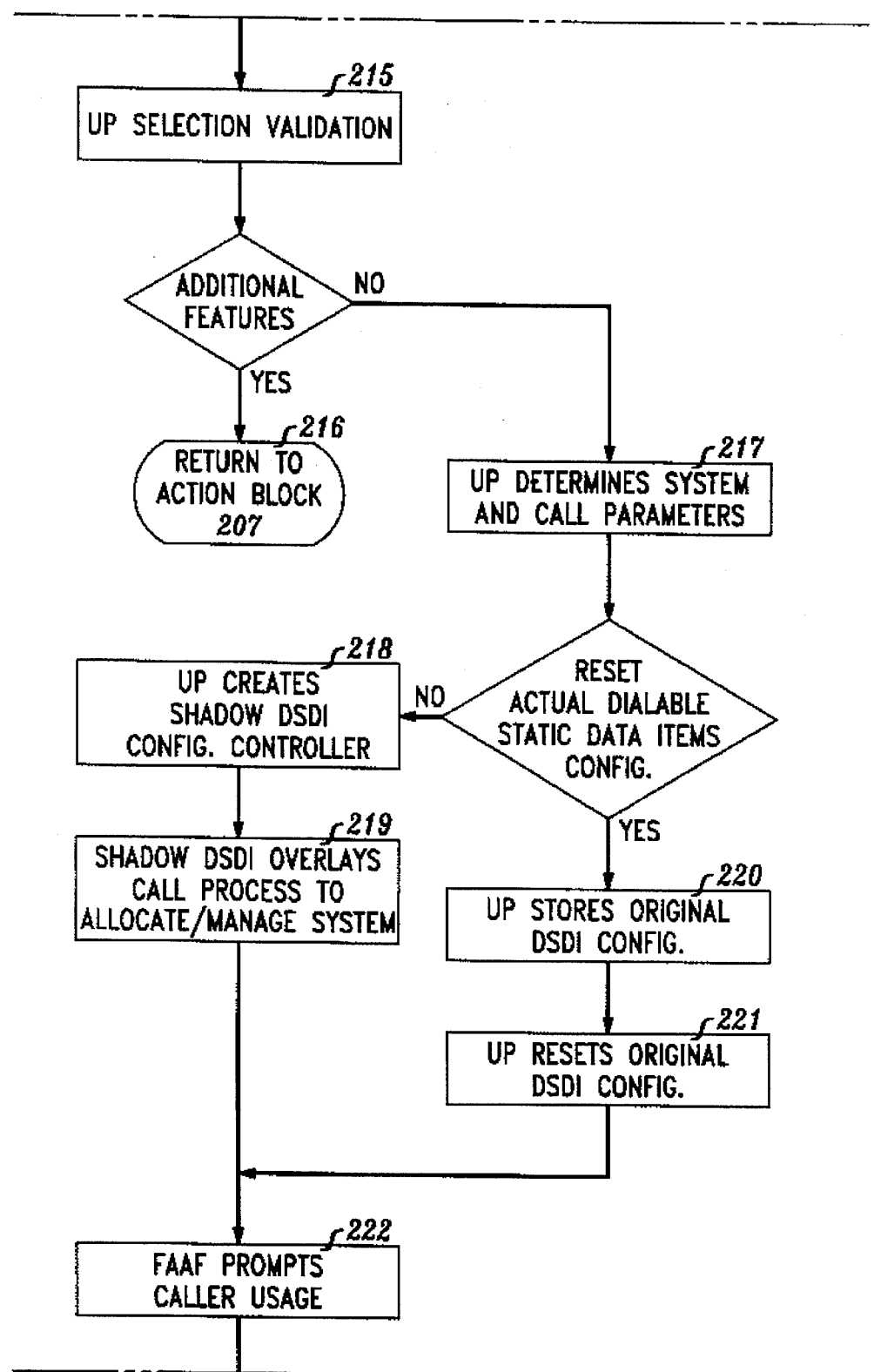

Proceeding along FIG. 2c, if the caller confirms the selections made and that no additional custom features are desired, based upon the system parameters including parameters provided by the caller (action block 217), the UP translates the interim feature keys into new feature keys corresponding to the Custom Feature selections made by the caller and either: (i) creates a shadow static data block and controller on top of and casting a shadow fully or partially over the call process (action block 218) to allocate/manage the system hardware and software as though the shadow static data block items were the part of the actual static data block for the terminal port (action block 219) by filtering the system reference to the actual data block through the static data block; or (ii) stores the original feature keys or static data block items configuration (action block 220) and resets the dialable static data items to the new feature keys configuration (action block 221). The FAAF provides the caller with instructions for use of the now available feature(s), including how the feature(s) will be terminated (action block 222) and the feature processor establishes access for the associated hardware and software through the call process for the additional custom features selected and establishes termination triggers in the call process (action block 223).

Figure 2D:
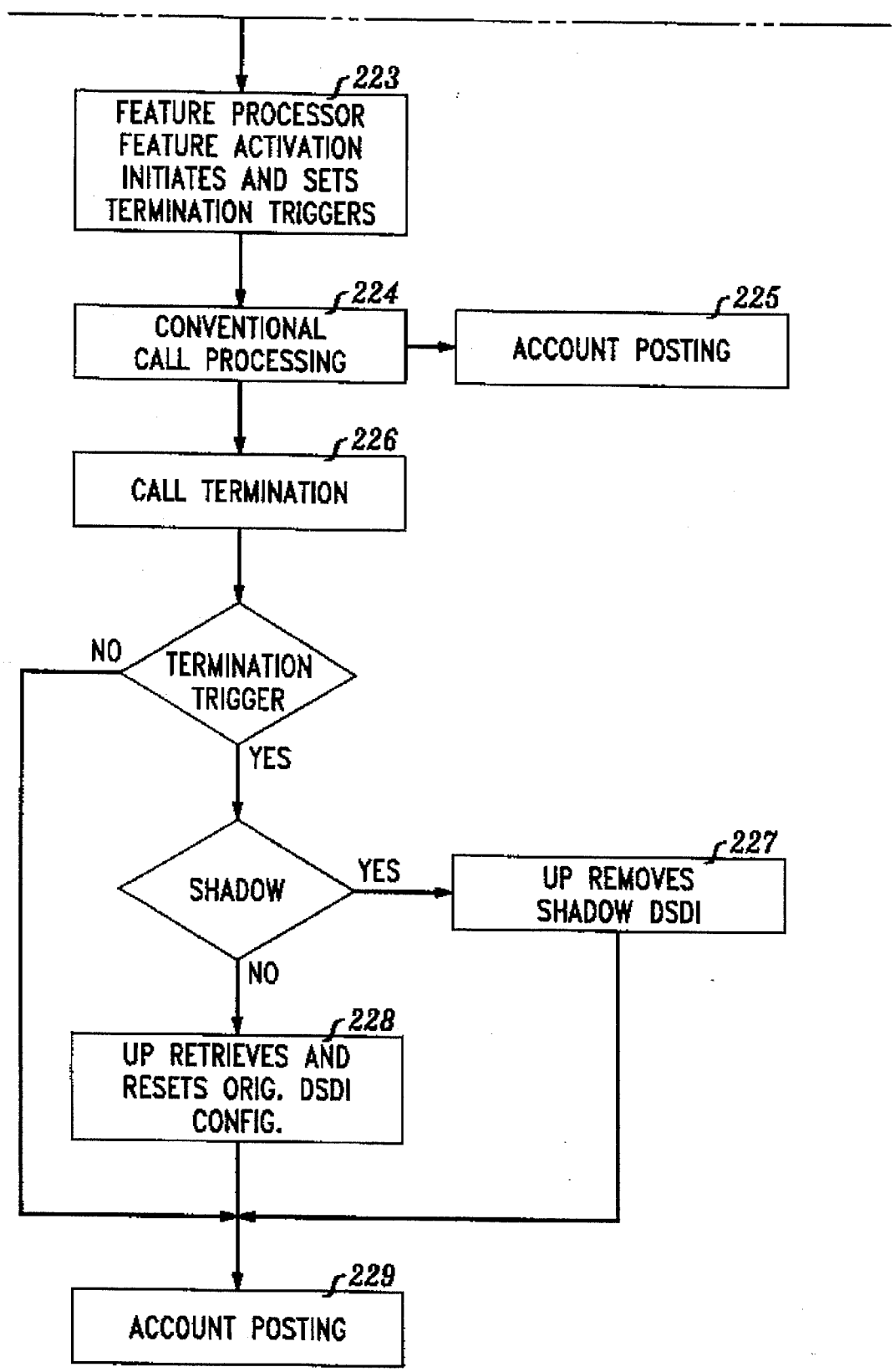

Proceeding along FIG. 2d, the caller then proceeds with conventional call processing (action block 224) and the network posts the system charges to the caller's account (action block 225).

Upon activation of a termination trigger, illustrated by the decision block so labeled, the call process accesses the UP which either: (i) removes the shadow static data block (action block 227) or (ii) retrieves the original key configuration and resets the key configuration in the static data block to the original settings (action block 228). Examples of termination triggers include cessation of traffic on the line serving the port, or replacing the handset on the switchhook, or the passage of a period of time. In some instances a termination trigger may not be set permitting the feature to remain active until the caller or the service provider actively modifies feature availability.

As part of the conventional call process, the caller's account is accessed and appropriate entries are posted including any one-time charges, subscription charges and unit/time charges incurred as a result of electing any custom feature or its use (action block 229). Because posting can occur at different times in a call process, it is shown both as action block 225 and action block 229.

As indicated, the caller may elect to add a custom feature to his service not as a one-time usage, but as a subscribed feature, as part of the resetting of the dialable static data items or feature keys for the port. It is also possible with our invention to terminate subscribed custom features in the same fashion as they are added, the UP treating the termination of a subscribed feature as an option selected in the decision tree for the feature.

Further, our invention anticipates that resetting of the feature keys in the static data block may not be desired. Consequently, an alternative is provided in our invention in which a shadow static data block and controller, containing the desired and designated feature keys, is created which controls the call process. We see this most useful with on-demand election of a custom feature. There is no need to place the actual static key configuration in memory nor is there any need to reset the key configuration following call termination. Said another way, the caller's terminal port is bootstrapped by the key features resident in a shadow terminal controller which exist only so long as the on-demand call.

Our invention further anticipates that Feature Processors can be purpose-built to simplify use and access, for example by constructing the access code to be a mnemonic of the feature and having only one feature available from that feature processor. By so constructing the Feature Processor, a caller can, without reference to a directory because of the caller's easy recall of the mnemonic, dial a desired feature without regard to the location of the feature processor with respect to the local switching system or the features accessible through the actual configuration of the terminal port's static data block; the FEAAP confirms authorization, for example, that a valid calling card number is presented, and the FAAF provides a simple prompt announcement of the calling feature reached and instructions on how to proceed with the call. The UP creates a shadow static data block and controller on top of the call process to allocate and manage the public switched telephone network hardware and software as though the actual static data block configuration had provided access to the feature.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. An automated method of temporarily providing additional services on demand as part of a call process for a caller's terminal port in a telecommunications network, comprising:

accessing by a feature processor of a block of data in a first region of the network which defines services then available to the caller's terminal port;

accessing by a feature processor a block of data in a second region of the network which defines additional services available for the network;

receiving on demand inputs initiated by a caller;

populating the second region of the network using the feature processor with data which identifies one or more additional services as selected for the call process;

overlaying the first region data with the second region data whereby at least a portion of the second region data overshadows at least a portion of the first region data to control the call process and provide the caller, from the additional services defined in the second region data, additional services at the port temporarily during the call process;

leaving the data in the first region unchanged by the overlaying; and automatically removing the overlaying second region upon satisfaction of the demand.

2. An automated method in a telecommunications network of providing, in addition to an initial set of feature services as defined by feature keys in a primary block of data that is associated with a terminal port, additional custom feature services, to a caller on demand as part of a call process for a terminal port in a telecommunications network, the additional custom feature services defined by feature keys in a secondary block of data, comprising:

creating the call process by a processor in the telecommunications network;

accessing the secondary data block for the port for the call process by the processor;

selecting desired feature keys;

recording selected desired feature keys into the secondary data block;

identifying selected feature keys which are to be available indefinitely;

identifying selected feature keys which are to be available temporarily;

modifying the call process by a controller which preempts reference by the network to the initial set of feature services, at least in part, with feature keys in the secondary block of data to thereby include the selected feature keys, wherein the telecommunications network provides the call process access to the custom feature services selected and use of the features in at least one call involving the port; and automatically ceasing access to temporarily selected custom feature services upon the satisfaction of temporary use.

3. The method of claim 2 wherein accessing comprises:

receiving authorization signals initiated by the caller; and verifying the authorization signals to the processor.

4. The method of claim 2 wherein selecting comprises:

receiving signals comprising the caller's additional custom feature service selection choice; and retaining each selection choice made.

5. The method of claim 4 wherein selecting further comprises:

prompting the caller with selection choices through a prompt process.

6. The method of claim 5 wherein the prompt process is based upon and consistent with a branching decision tree, the branch of prompts taken and the next prompt initiated determined by each preceding selection choice of the caller.

7. The method of claim 4 wherein selecting further comprises:

verifying the choices selected are consistent with the services available to the port by comparing feature keys selections to features the network defines as available to the port.

8. The method of claim 2 wherein modifying comprises:

identifying the feature keys selections existing for the port at the initiation of the call process by querying the primary data block;

identifying and storing the feature key selections existing for the port at the initiation of the call process in retrievable form;

changing the primary data block to reflect the feature keys selected during the call process by the caller without altering the stored feature key selections which existed for the port at the initiation of the call process; and updating the primary data block with the stored feature key selections to replace all data in the primary data block upon the satisfaction of temporary use.

9. The method of claim 8, wherein modifying further comprises:

establishing at least one termination trigger in the telecommunications network;

retrieving the stored feature key selections and the data block for the port following activation of the termination trigger; and changing the data block to reflect the retrieved feature keys selections.

10. The method of claim 2 wherein modifying comprises:

creating a shadow data block for the feature keys selected through the update process;

overlaying at least a portion of the data block with the shadow data block whereby the shadow data block controls the network to permit access to custom feature services defined in the shadow data block.

11. The method of claim 10 wherein modifying further comprises:

establishing at least one trigger in the telecommunications network; and removing the shadow data block from over the data block following activation of the trigger.

12. The method of claim 2 further comprising:

charging at least one defined account for the selection of the custom feature service or the use of the custom feature service.

13. The method of claim 2 in which the custom feature keys comprise data items which control feature use to be either one time use or subscription use.

14. In a telecommunications network, apparatus within the telecommunications network, for providing custom feature services to individual callers on demand and selectively granted to a caller at a standard telephone, having a keypad and a handset, connected to a terminal port as part of a call process, comprising:

a data block within the telecommunications network which defines custom feature services normal to the terminal port at the commencement of a call process and which defines additional custom feature services which are available for on demand access at the terminal port;

a processor for receiving a call from the caller;

voice means responsive to said call processor for prompting the caller through the telephone handset to select the custom feature services desired from available selections defined in the data block;

means for the caller to signal selections of additional custom feature services using the telephone keypad or using the telephone handset; and means for temporarily modifying the data block based upon the caller selection, wherein the call process provides the caller access to and use of custom feature services including selected custom feature services which are other than services normal to the terminal port.

15. The apparatus of claim 14 further comprising:

means for verifying the caller is authorized to modify the data block to add access to one or more additional custom feature services or otherwise change access to custom feature services;

means for querying the data block to determine information related to the custom feature services normal to the terminal port and the additional custom feature services which can be made accessible at the terminal port;

means for establishing a termination trigger in the call process; and means for automatically returning custom feature services for the terminal port to the custom feature services normal to the terminal port at the commencement of a call process following the termination trigger activating, whereby the ability to use previously added additional custom feature services is thereafter restricted and the availability of selected additional custom feature services automatically ceases upon satisfaction of the defined demand.

16. An automated apparatus for modifying, on demand, as part of a call process from a caller using a standard telephone, custom feature services provided by a telephone network for a terminal port, comprising:

a. a feature processor which interactively defines the desired feature services using voice prompts to guide the caller through a feature selection process, the process utilizing a decision tree approach of presenting options to which the caller responds and thereafter presenting further options based upon the response made by the caller, this continuing until no further selections are to be made by the caller along the decision tree branch taken, with input from the caller made by keypad or voice signals;

b. a data block in the network created by the feature processor which represents the defined normal custom feature services for the terminal port and which the processor modifies to reflect selections made by the caller;

c. a controller in the network which accesses the data block, wherein the network provides the desired custom feature services to the port selected by the caller;

d. memory in which is stored the data representing the custom feature services which were the normal feature services defined for the terminal port at the commencement of the call process; and e. means for identifying a condition or event to the network which will, upon occurrence, access memory and replace the data then existing in the data block with the data in memory to return the feature services available to the terminal to those available prior to modification, whereby the custom feature services available at the terminal port are modified on demand to include custom feature services other than normal custom feature services for a period of use then automatically returned to the custom feature services normal to the terminal port.

17. An automated apparatus for modifying, on demand, as part of a call process from a caller using a standard telephone, custom feature services provided by a telephone network for a terminal port, comprising:

a. a feature processor which interactively defines the desired feature services using voice prompts to guide the caller through a feature selection process, with input from the caller made by telephone keypad or voice signals;

b. a data block in the network, the data block having a first region which represents data defining normal custom feature services for the terminal port and a second region which represents the data defining additional custom feature services available for access by the terminal port;

c. memory created by the feature processor in which is stored the data representing the additional custom feature services which were selected by the caller for the call process;

d. a controller in the network which accesses the data in the first region of the data block and the data in memory in such a manner that the data in memory preempts the data in the first region of the data block whereby the controller causes the network to provide the desired custom feature services selected by the caller to the terminal port; and e. means for identifying a condition or event to the network which upon occurrence will access memory and delete the data representing the additional custom feature services which were selected by the caller for the call process, whereby the custom feature services available at the terminal port are modified on demand to include custom feature services other than normal custom feature services for a period of use then automatically returned to the custom feature services normal to the terminal port once the demand is satisfied.

18. In a telecommunications network, apparatus within the telecommunications network for providing custom feature services to individual callers on demand and selectively granted to a caller as part of a call process at a standard telephone, having a keypad and a handset, connected to a terminal port, comprising:

a data block within the telecommunications network which defines in a first region data for custom feature services normal to the terminal port at the commencement of a call process and which defines in a second region data for additional custom feature services which are available for on demand access at the terminal port;

a call processor for receiving a call from the caller;

means responsive to said call processor for prompting the caller through the telephone to select the custom feature services desired from available selections defined in the second region of the data block;

means for the caller to signal selections of additional custom feature services using the telephone; and memory for temporarily storing the data from the second region of the data block defining the additional custom feature services selected by the caller;

a controller which accesses the data in the first region of the data block and the data in memory defining the additional custom feature services selected by the caller and which gives precedence to the data in memory over the data in the first region of the data block to provide the caller access to and use of custom feature services including selected custom feature services which are other than services normal to the terminal port.

19. The apparatus of claim 18 further comprising:

means for automatically deleting from the memory the data for the additional custom feature services selected by the caller, whereby the availability of selected additional custom feature services automatically ceases upon satisfaction of the defined demand and the custom feature services available to the terminal port at the commencement of the next call process are the custom feature services defined by the data in the first region of the data block.

20. In a telecommunications network, apparatus within the telecommunications network for providing custom feature services to individual callers on demand and selectively granted to a caller as part of a call process at a telephone, connected to a terminal port, comprising:

a data block within the telecommunications network which defines in a first region data for custom feature services normal to the terminal port at the commencement of a call process and which defines in a second region data for additional custom feature services which are available for on demand access at the terminal port;

a processor for receiving a call from the caller;

means responsive to said call processor for prompting the caller through the telephone to select the custom feature services desired from available selections defined in the second region of the data block;

means for receiving signals from the caller indicative of selections of additional custom feature services using the telephone; and memory for temporarily storing the data from the second region of the data block defining the additional custom feature services selected by the caller;

a controller which accesses the data in the first region of the data block and the data in the memory defining the additional custom feature services selected by the caller and which gives the caller access to and use of custom feature services including selected custom feature services which are stored in the memory;

means for establishing a termination trigger activated by an event associated with satisfaction of the defined demand; and means, responsive to the establishing means, for deleting from the memory the data for the additional custom feature services selected by the caller upon the activation of the termination trigger, whereby the availability of selected additional custom feature services automatically ceases upon satisfaction of the defined demand.

* * * * *